United States Patent
Zhang et al.

(10) Patent No.: US 12,493,695 B2
(45) Date of Patent: Dec. 9, 2025

(54) DATA DETECTION METHOD AND ELECTRONIC DEVICE

(71) Applicant: Dell Products L.P., Round Rock, TX (US)

(72) Inventors: Weibing Zhang, Beijing (CN); Lei Gao, Beijing (CN); Chen Gong, Beijing (CN)

(73) Assignee: Dell Products L.P., Round Rock, TX (US)

( * ) Notice: Subject to any disclaimer, the term of this patent is extended or adjusted under 35 U.S.C. 154(b) by 251 days.

(21) Appl. No.: 18/215,422

(22) Filed: Jun. 28, 2023

(65) Prior Publication Data

US 2024/0211598 A1    Jun. 27, 2024

(30) Foreign Application Priority Data

Dec. 22, 2022   (CN) .......................... 202211659610.3

(51) Int. Cl.
*G06F 21/56* (2013.01)
*G06F 12/02* (2006.01)
*G06F 21/55* (2013.01)

(52) U.S. Cl.
CPC .......... *G06F 21/566* (2013.01); *G06F 12/023* (2013.01); *G06F 21/554* (2013.01); *G06F 2221/034* (2013.01)

(58) Field of Classification Search
CPC .... G06F 21/566; G06F 21/554; G06F 12/023; G06F 16/26; G06F 16/35; G06F 16/38; G06F 16/1734
See application file for complete search history.

(56) References Cited

U.S. PATENT DOCUMENTS

| | | | |
|---|---|---|---|
| 10,650,146 B1* | 5/2020 | Gaurav | G06F 21/562 |
| 11,637,896 B1 | 4/2023 | Prakashaiah et al. | |
| 11,777,992 B1 | 10/2023 | Cross et al. | |
| 2016/0034523 A1* | 2/2016 | Aronovich | G06F 16/2365 |
| | | | 707/692 |
| 2019/0005235 A1* | 1/2019 | Klonowski | G06F 21/6218 |
| 2019/0207969 A1* | 7/2019 | Brown | G06F 21/552 |
| 2020/0250306 A1* | 8/2020 | Pendyala | G06F 16/1748 |
| 2020/0394302 A1* | 12/2020 | Nashimoto | G01C 21/16 |
| 2021/0026960 A1* | 1/2021 | Martin | G06F 3/067 |
| 2021/0173930 A1* | 6/2021 | Dahal | H04L 63/145 |

(Continued)

*Primary Examiner* — Tarek Chbouki
(74) *Attorney, Agent, or Firm* — BainwoodHuang (57) ABSTRACT

Data detection techniques involve: determining count features respectively corresponding to a plurality of time points based on data blocks of a storage object; determining, for a first time point among the plurality of time points and according to the count features respectively corresponding to the plurality of time points, a plurality of corresponding correlation coefficients between a count feature for the first time point and count features for the other time points among the plurality of time points; and determining, if a score calculated according to the plurality of correlation coefficients is less than a predetermined threshold, that the storage object corresponding to the first time point is under attack. Accordingly, a storage system can be protected, and the point in time when it is attacked by malware can be quickly located, which improves checking efficiency, saves checking costs, and helps users to quickly recover stored data.

14 Claims, 4 Drawing Sheets

(56) References Cited

U.S. PATENT DOCUMENTS

| | | |
|---|---|---|
| 2021/0311641 A1 | 10/2021 | Prakashaiah et al. |
| 2022/0138223 A1 | 5/2022 | Sonner et al. |
| 2022/0374519 A1* | 11/2022 | Botelho .............. G06F 11/1464 |
| 2023/0046601 A1* | 2/2023 | Hamilton .............. G06Q 10/067 |
| 2023/0103474 A1* | 4/2023 | Gunda ................ G06F 11/1448 |
| | | 711/162 |
| 2023/0247048 A1 | 8/2023 | Samosseiko et al. |
| 2024/0033874 A1* | 2/2024 | Ishiyama ........... G05B 19/4065 |

* cited by examiner

DATA DETECTION METHOD AND ELECTRONIC DEVICE

CROSS-REFERENCE TO RELATED APPLICATION

This application claims priority to Chinese Patent Application No. CN202211659610.3, on file at the China National Intellectual Property Administration (CNIPA), having a filing date of Dec. 22, 2022, and having "METHODS AND DEVICES FOR DATA DETECTION" as a title, the contents and teachings of which are herein incorporated by reference in their entirety.

TECHNICAL FIELD

Embodiments of the present disclosure relate to the technical field of computers, and more particularly, to a data detection method and an electronic device.

BACKGROUND

With the development and popularization of networks, network security has become more and more important. Users may be exposed to various malicious network attacks, such as ransomware. Ransomware is a type of malicious extortion software that prevents users from accessing files, systems, or networks, until a ransom is get. Malware attacks may lead to interruption of important operations or loss of critical information and data, causing serious impacts and bringing major threats to the security of user data.

Data storage servers are often the target of ransomware attacks. Because ransomware encrypts data and the encrypted data content is random, conventional antivirus methods cannot effectively detect ransomware activities. More and more ransomware variants make it more difficult to detect ransomware activities.

SUMMARY OF THE INVENTION

According to example embodiments of the present disclosure, a technical solution of data detection is provided for determining a point in time when stored data may be attacked by malware.

In a first aspect of the present disclosure, a method is provided, and the method may include: determining count features respectively corresponding to a plurality of time points based on data blocks of a storage object, wherein the count features include a plurality of count values for the data blocks; determining, for a first time point among the plurality of time points and according to the count features respectively corresponding to the plurality of time points, a plurality of corresponding correlation coefficients between a count feature for the first time point and count features for the other time points among the plurality of time points; and determining, if a score determined according to the plurality of correlation coefficients is less than a predetermined threshold, that the storage object corresponding to the first time point is under attack.

By implementing the method provided in the first aspect, the point in time of an attack by malware can be quickly located, which improves checking efficiency, saves checking costs, and helps users to quickly recover stored data.

In a second aspect of the present disclosure, an electronic device is provided. The electronic device includes: a processor; and a memory coupled to the processor and having instructions stored therein, where the instructions, when executed by the electronic device, cause the electronic device to perform operations including: determining count features respectively corresponding to a plurality of time points based on data blocks of a storage object, wherein the count features include a plurality of count values for the data blocks; determining, for a first time point among the plurality of time points and according to the count features respectively corresponding to the plurality of time points, a plurality of corresponding correlation coefficients between a count feature for the first time point and count features for the other time points among the plurality of time points; and determining, if a score determined according to the plurality of correlation coefficients is less than a predetermined threshold, that the storage object corresponding to the first time point is under attack.

By implementing the electronic device provided in the second aspect, the point in time of an attack by malware can be quickly located, which improves checking efficiency, saves checking costs, and helps users to quickly recover stored data.

In a third aspect of the present disclosure, a computer program product is provided, the computer program product is tangibly stored in a computer-readable medium and includes machine-executable instructions, wherein the machine-executable instructions, when executed, cause a machine to perform the method according to the first aspect of the present disclosure.

In a fourth aspect of the present disclosure, a computer-readable storage medium having a computer program stored thereon is provided, wherein the computer program, when executed by a device, causes the device to perform the method according to the first aspect of the present disclosure.

As can be seen from the above description, with the solutions according to the embodiments of the present disclosure, the point in time of an attack by malware can be quickly located, which improves checking efficiency, saves checking costs, and helps users to quickly recover stored data.

It should be understood that the Summary of the Invention part is provided to introduce the selection of concepts in a simplified form, which will be further described in the Detailed Description below. The Summary of the Invention part is neither intended to identify key features or main features of the present disclosure, nor intended to limit the scope of the present disclosure.

BRIEF DESCRIPTION OF THE DRAWINGS

The above and other features, advantages, and aspects of embodiments of the present disclosure will become more apparent in conjunction with the accompanying drawings and with reference to the following detailed description. In the accompanying drawings, identical or similar reference numerals represent identical or similar elements, in which.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described in more detail below with reference to the accompanying drawings. Although the accompanying drawings show some embodiments of the present disclosure, it should be understood that the present disclosure can be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

Attacks by malware pose a major threat to the security of user data. For example, because data storage servers are used to host important files for users, they are often the target of ransomware attacks. Ransomware replaces files on the hacked device with a version encrypted by a key controlled by the attacker, and once the ransomware has finished encrypting and replacing the user files, it can prevent the user from accessing normal data until a ransom is get. Since activities of ransomware generally include routine operations such as reading, writing, creating, and deleting files, it is difficult for a storage system to distinguish between ransomware and itself through behaviors, and thus it cannot detect in time that it has been attacked. In addition, data written by ransomware is generally encrypted data. Since the encrypted data content is random, conventional antivirus methods usually cannot effectively detect data modification and cannot assist in data recovery. In some cases, integrity check of files can help detect ransomware attacks, but scanning all files in the storage system continuously is too costly in terms of performance for the storage system.

In some embodiments, a storage snapshot is a set of reference marks for data at a specific point in time, and can be defined as a set of pointers for representing an accessible copy of data stored on a storage device that provides a user with a rollback to the specific point in time. This storage device may be a disk drive, a tape, a network storage server, a storage area network (SAN), or the like. In some embodiments, a snapshot can be considered as a directory, with each pointer describing information or data stored on a disk. A computer may treat this snapshot as a full backup of data. In some examples, snapshots can save the current directory of a file system and the status of subtrees below it, so creating a snapshot is equivalent to backing up every index node in a directory tree (subdirectory trees below the nodes), because the index nodes carry all the information about the file system. Snapshots usually have a small amount of data and occupy a small storage space.

Snapshots can be scheduled to be automatically recorded at a specific time or at a certain frequency, which helps to protect data using automatic snapshot scheduling policies. Snapshots can be used to reduce the threat posed by ransomware, and if a user has a "clean" snapshot of a previous point in time that was not affected by ransomware encryption, then a rollback to the state of the clean snapshot can be performed to eliminate the threat of the attacking program. In some implementations, data can be protected by scheduling snapshots. When a storage system is attacked by malware, normal files and data are replaced by the ransomware with encrypted content. Snapshots corresponding to the stored data under attack may be called "damaged" snapshots. When an attack is discovered, the user can select a snapshot at a point in time at which the system is not under attack to perform a rollback to quickly restore normal data accesses. It would be tedious and time-consuming to have the user manually install from newest to oldest and check each snapshot to determine which ones are clean and perform a rollback. Usually, as the number of snapshots increases, the storage space occupied by the snapshots also becomes larger. In order to save storage space, the amount of space consumed by snapshots needs to be controlled, and snapshots that exceed the specified storage space threshold or storage number or earlier snapshots of which the retention period has expired will be squeezed out of the storage space and automatically deleted. For files encrypted by malware, even if there are snapshots to protect the data, if the attack activity cannot be discovered in time, the snapshot policy will still delete snapshots, and the saved snapshots may all be damaged snapshots. Moreover, earlier clean snapshots have been deleted, then it may still be impossible to recover clean versions of the data files, resulting in a very large loss of stored data.

Embodiments of the present disclosure propose a data detection method and an electronic device that use a scoring mechanism based on sampled data to determine the suspicious time of a malware attack. The method may include: determining count features respectively corresponding to a plurality of time points based on data blocks of a storage object, wherein the count features include a plurality of count values for the data blocks; calculating, for a first time point among the plurality of time points and according to the count features respectively corresponding to the plurality of time points, a plurality of corresponding correlation coefficients between a count feature for the first time point and count features for the other time points among the plurality of time points; and determining, if a score calculated according to the plurality of correlation coefficients is less than a predetermined threshold, that the storage object corresponding to the first time point is under attack. By implementing embodiments of the present disclosure, a storage system can be protected, and the point in time when it is attacked by malware can be quickly located, which improves checking efficiency, saves checking costs, and helps users to quickly recover stored data.

Multiple embodiments of the present disclosure are typically applicable to storage systems that support in-line deduplication (ILD), but can also be applicable to other storage objects with data sampling and data statistics functions, such as file systems, logical storage units, network storage servers, directories, and the like. Through data sampling and statistics of a storage object, data features of the storage object can be determined.

For the huge amount of stored data of the storage object, a significant portion of the data already stored is duplicated, which wastes storage space and increases the workload of storage. In order to alleviate the space growth problem of the storage system, deduplication technology can be used. Deduplication is a special data compression technique that reduces redundant data, and the technique can effectively improve storage utilization. During the processing of deduplication, through an analysis process, a unique data block is identified and saved, then other data blocks are analyzed and compared with this data block, and a data block that is identical to it will be replaced with a reference to an already existing data block. This can greatly reduce the amount of the stored data. During this analysis process, an encrypted hash (such as MD5 or SHA) can be used to identify whether two data blocks are the same.

The policies of deduplication techniques mainly include file-level deduplication, data block-level deduplication, and byte-level deduplication. The file-level deduplication policy has a high calculation speed, but the granularity thereof is too coarse to accurately identify duplicate data. The data block-level deduplication policy is relatively accurate, but there are many hash values to be calculated because data blocks are taken as units, and hash conflicts may possibly occur. The byte-level deduplication policy performs comparison in bytes without involving hash algorithms, so it can avoid collisions and can thus achieve higher accuracy, but it takes too much time. In some embodiments, a deduplication policy that combines data block-level and byte-level policies can be chosen. Firstly, a file is split into data blocks, and its hash values are calculated in a unit of data blocks. If the hash value of a new data block matches a certain hash in a device hash index, when they are the same, only a pointer is stored and it points to the original location where the same data block is stored; otherwise, if the data block is unique, it is written to the disk, and its hash value is also stored in the index. In some embodiments, in-line deduplication (ILD) is a function used in some storage systems to simplify data, and refers to the processing computation of deduplication on a target device (or target node) in real time at the same time when the data enters that target device. It is detected whether a similar data block has already exists before a data block is written, and if the device identifies that a certain data block has already been saved in the storage system, it will not save this new data block, but only makes a reference to the existing data block. This can avoid redundant disk data writes, improves the space storage efficiency of the storage system, and reduces network transmission.

In some embodiments of the present disclosure, counting may be performed for deduplicated data blocks of the storage object based on a plurality of statistical features to determine count features of the storage object, wherein the count features include a plurality of count values for the deduplicated data blocks. In some examples, the data blocks in the storage object are matched with the statistical features of the deduplicated data blocks, and the number of respective statistical features in the plurality of statistical features of the deduplicated data blocks of the storage object is counted by using a counter. For example, every time an aligned statistical feature obtained through matching is submitted, the count of the statistical feature is increased by one, and every time a statistical feature is removed, the count is decreased by one. The count features of the storage object are determined based on the counts of the plurality of statistical features of the storage object obtained through counting. Here, the statistical features of the deduplicated data blocks may be, for example, data blocks of 8 KB bytes with fixed length and content that are to be counted.

Figure 1:
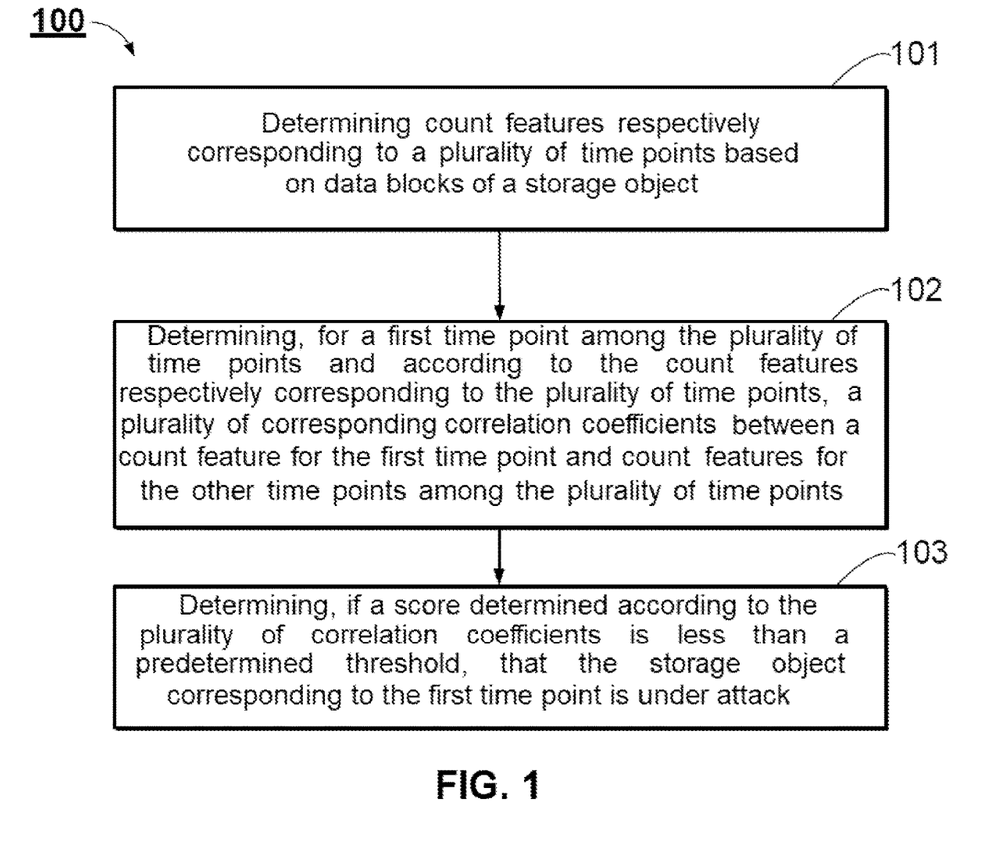
FIG. 1 illustrates a flow chart of a data detection method according to some embodiments of the present disclosure.

FIG. 1 illustrates a flow chart of data detection method 100 according to some embodiments of the present disclosure. Using method 100, it is possible to quickly locate the point in time when a storage system is attacked by malware. Method 100 may be applied to an electronic device with a storage system, such as a personal computer (PC), a computer cluster, and a server. The embodiments of the present disclosure do not make any limitation to the device type and the like of the electronic device that implements method 100. It should be understood that, in the embodiments of the present disclosure, the subject implementing method 100 may be implemented by an entity device or may be implemented by a plurality of entity devices together. It is understandable that the subject implementing method 100 may be a logical function module in an entity device, or may be a logical function module composed of a plurality of entity devices. It should be understood that, in the following embodiments of the present disclosure, the steps in the method provided in the embodiments of the present disclosure may be performed by one entity device, or the steps in the method provided in the embodiments of the present disclosure may be performed by a plurality of entity devices cooperatively, which is not limited in the embodiments of the present disclosure. It should be understood that method 100 may further include additional blocks that are not shown and/or may omit blocks that are shown, and the scope of the present disclosure is not limited in this regard.

At block 101, count features respectively corresponding to a plurality of time points are determined based on data blocks of a storage object, wherein the count features include a plurality of count values for the data blocks. At block 102, for a first time point among the plurality of time points and according to the count features respectively corresponding to the plurality of time points, a plurality of corresponding correlation coefficients between a count feature for the first time point and count features for the other time points among the plurality of time points are determined. At block 103, if a score determined according to the plurality of correlation coefficients is less than a predetermined threshold, it is determined that the storage object corresponding to the first time point is under attack. By implementing method 100, the point in time of an attack by malware can be quickly located, which improves checking efficiency, saves checking costs, and helps users to quickly recover stored data.

In some embodiments, the storage object may refer to a file system, a network storage service, a specified file, directory or data (e.g., a snapshot), and the like, which is not limited in the present disclosure.

In some embodiments, the metrics of the count of deduplicated data blocks, deduplication ratio, deduplicated set, compression ratio, or data of other entropy may be used as data features to help identify whether an attack by malware occurs, which is not limited by the embodiments in the present disclosure. After an attack by malware has occurred, these feature values can produce a significant entropy change.

In some examples, automatic snapshot creation can be set to be performed at a specific time or at a certain frequency. For example, a snapshot is created every 2 hours based on the current state of the storage object, which helps to protect the stored data, so that it can be restored to the previous storage backup that was not under attack after being attacked by malware.

In some embodiments, changes in data features caused by ransomware attacks can be identified based on data sampling, data statistics, and machine learning, so that the storage object can quickly and effectively find a point in time at which the system is not under attack during ransomware attack recovery. When it is discovered that the storage object may be attacked, the currently saved snapshot is locked so that it will not be deleted, and then an alert is sent to the administrator, or the system is triggered for an integrity check. A clean snapshot that has not been attacked by the malware is found based on that suspicious point in time. Then, based on this clean snapshot, it is possible to help the user recover quickly from the detected ransomware attack.

In some embodiments, the number of the data blocks in the storage object that conform to the statistical features at the plurality of time points is counted. The count features respectively corresponding to the plurality of time points are generated according to the number counted. In some embodiments, the statistical features of the data blocks are determined prior to counting the number of the data blocks in the storage object that conform to the statistical features at the plurality of time points, wherein the statistical features of the data blocks may be binary bytes of a predetermined length. In some embodiments, the data blocks are deduplicated data blocks.

In some embodiments, the deduplicated data that is detected and counted may be statistical features of the data blocks. In some embodiments, the counting of the deduplicated data blocks may be automatically performed at a periodic interval (e.g., two hours) as data samples. In some embodiments, the statistical features of the deduplicated data blocks are binary bytes having a predetermined length and content. In some embodiments, the digest of the counted deduplicated data blocks includes multiple items, and since exhaustive counting wastes processing power and storage space, a deduplicated data block with a high duplicate ratio may be selected as a statistical sample, wherein the statistical feature of the deduplicated data block may be an automatically statistically screened deduplicated data block with a duplicate ratio meeting a predetermined threshold.

Figure 2:
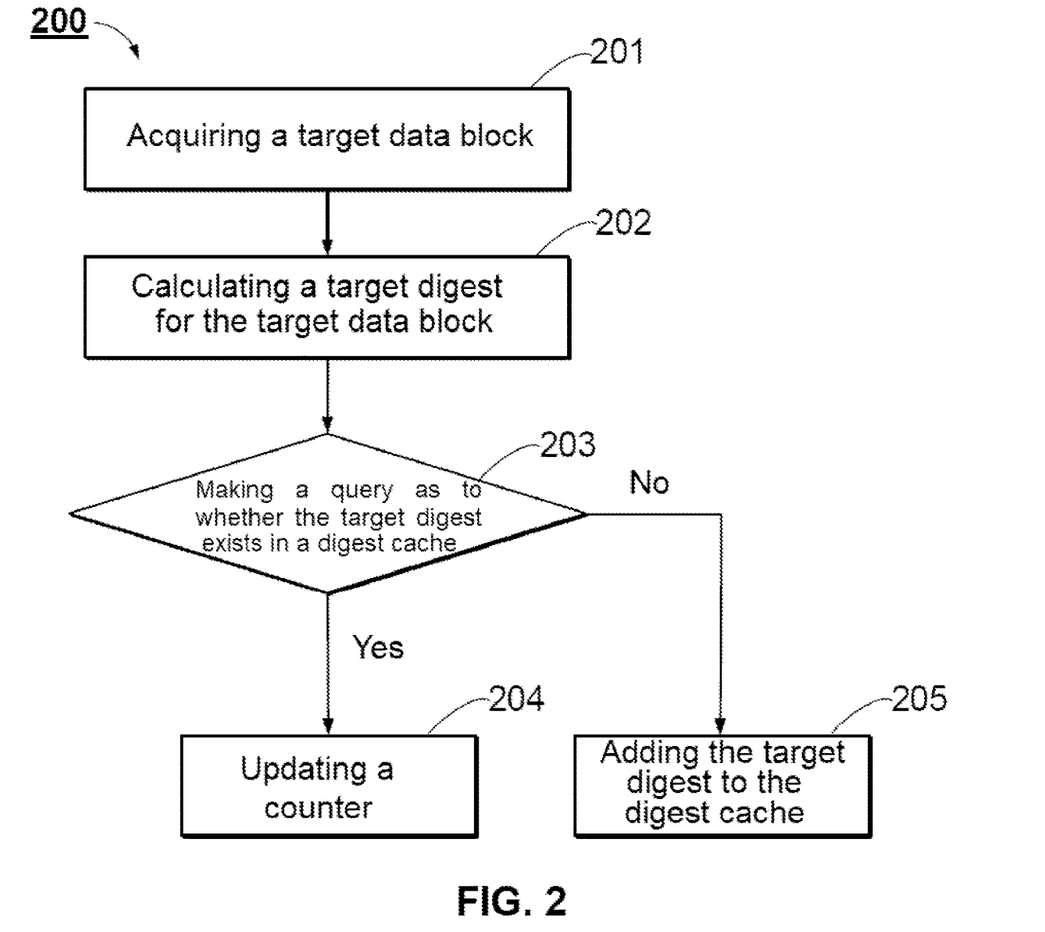
FIG. 2 illustrates a flow chart of a counting method according to some embodiments of the present disclosure.

Referring to the flow chart of a counting method illustrated in FIG. 2, in some embodiments, a digest may be created for the data blocks using a hash function, and data blocks with the same hash value are considered to have the same data block content. At block 201, a target data block is acquired. For example, the target data block is read before being written. At block 202, a target digest for the target data block is calculated. For example, a hash value may be calculated for that target data block. At block 203, a query is made as to whether this target digest exists in a digest cache, and if so, the process proceeds to block 204 to update a counter, wherein the counter is used to count the number of occurrences of the same deduplicated data block. If not, the process proceeds to block 205 to add the target digest to the digest cache. For example, the target digest is compared with every digest in the temporary digest cache. If the target digest already exists, then the counter is updated by increasing (decreasing) the number for that target digest by one, and if that target digest does not exist in the temporary digest cache, then the new digest is added to the temporary digest cache and is counted afterwards. It can be understood that the access to data blocks is a dynamic process, and as the number of data blocks increases, the count of the corresponding counter increases accordingly; and as the number of data blocks decreases, the count of the corresponding counter decreases accordingly. In some embodiments, the counting of the number of data blocks in the storage object that conform to the statistical features is set to be performed at a predetermined interval. For example, a counter is called every two hours to count the number of deduplicated data blocks, and scoring is performed for use in helping to discover whether a suspicious attack has occurred. In some examples, statistical feature counters for a plurality of storage objects may also be sent from the storage server to other devices to perform out-of-array checks.

It can be understood that implementations of various embodiments of the present disclosure do not rely on in-line deduplication techniques. In other embodiments, other data patterns, data features, application systems, and statistical methods may be used, and the scope of embodiments of the present disclosure is not limited in this regard.

In some embodiments, a plurality of corresponding correlation coefficients are determined based on distances between the count feature for the first time point and count features for the other time points among the plurality of time points. In some embodiments, the score is the average of the plurality of correlation coefficients. In one example, the following algorithms may be used to score data block features to help find out whether the storage object is under suspicious attack. It can be understood that the following scoring approaches are examples only. In other embodiments, other data patterns, data features, application systems, and evaluation algorithms may be used, and the scope of embodiments of the present disclosure is not limited in this regard.

In the examples herein, for any two deduplicated data block count samples, the weight of change in the distribution of sample data may be expressed in terms of Euclidean distance. The count features of the current dataset C with count values of m deduplicated data blocks are denoted as $\{c_0, c_1, c_2, \ldots, c_m\}$, and the count features of the previous old dataset O are denoted as $\{o_0, o_1, o_2, \ldots, o_m\}$. Then, the Euclidean distance D(CO) between C and O is calculated, see Equation I:

$$D(C, O) = \sqrt{\sum_{i=0}^{m} (c_i - o_i)^2} \qquad \text{Equation I}$$

Similarly, the sample distribution distance of the deduplicated data between any two sample datasets $(S_x, S_y)$ can be calculated as $D(S_x, S_y)$. One distance matrix can be generated for all deduplicated sample datasets. Assuming that there are n datasets, the distance matrix is represented as follows:

$$\begin{bmatrix} D(S_0, S_0) & \cdots & D(S_0, S_n) \\ \vdots & \ddots & \vdots \\ D(S_n, S_0) & \cdots & D(S_n, S_n) \end{bmatrix}$$

Based on the distances between the above datasets, correlation coefficients can be used to evaluate the relationship between the vectors of change in the distribution of deduplicated data blocks between the datasets. In an example, the Pearson correlation coefficient of the statistical metric of the linear relationship between two variables is chosen. Two vectors of change in the distribution of deduplicated data blocks are denoted as $X=(x_0, x_1, \ldots, x_n)=(D(S_x, S_0), D(S_x, S_1), \ldots, D(S_x, S_n))$ and $Y=(y_0, y_1, \ldots, y_n)=(D(S_y, S_0), D(S_y, S_1), \ldots, D(S_y, S_n))$. The Pearson correlation coefficient can be calculated using the following Equation II, where $x_i$ and $y_i$ denote different values of X and Y:

$$P(X, Y) = \frac{\sum_{i=0}^{n}(x_i - \bar{x})(y_i - \bar{y})}{\sqrt{\left(\sum_{i=0}^{n}(x_i - \bar{x})^2\right)\left(\sum_{i=0}^{n}(y_i - \bar{y})^2\right)}} \quad \text{Equation II}$$

where the value of the correlation coefficient can be any value between −1 and 1. When the value is (0, 1], it means that the two variables are positively correlated; when the value is [−1, 0), it means that the two variables are negatively correlated; and when the value is 0, it means that the two variables are not correlated.

A scoring system is established based on the correlation coefficients between the plurality of deduplicated data samples described above. For the deduplicated block dataset, the correlation coefficient indicates the relationship between the changes in the distribution of deduplicated blocks. In another case, the correlation coefficient is how a dataset is evaluated by other datasets based on the changes in the distribution of data blocks. A scoring system can be established to evaluate the possibility that a storage object is subject to an attack by malware. In an example, for n datasets, the score $T_k$ of the kth dataset can be the average of the correlation coefficients from its sibling datasets (i.e., samples recorded at other time points), which is calculated with reference to the following Equation III:

$$T_k = \frac{\sum_{i \neq k}^{n} P(S_k, S_i)}{n-1} \quad \text{Equation III}$$

where the range of the scores is [−1, 1], which has the same meaning as the correlation coefficient described above. It indicates how a dataset is evaluated by other datasets. Based on this scoring score, a threshold can be set to evaluate whether the storage object may have been attacked by malware.

Figure 3A:
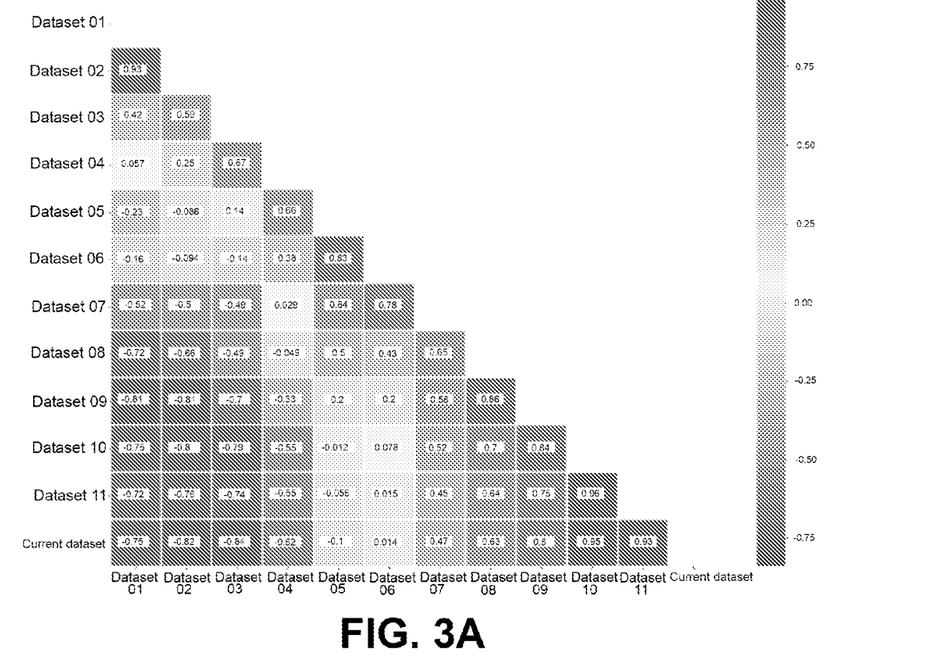
FIG. 3A illustrates a schematic diagram of an example of scoring according to some embodiments of the present disclosure.
Figure 3B:
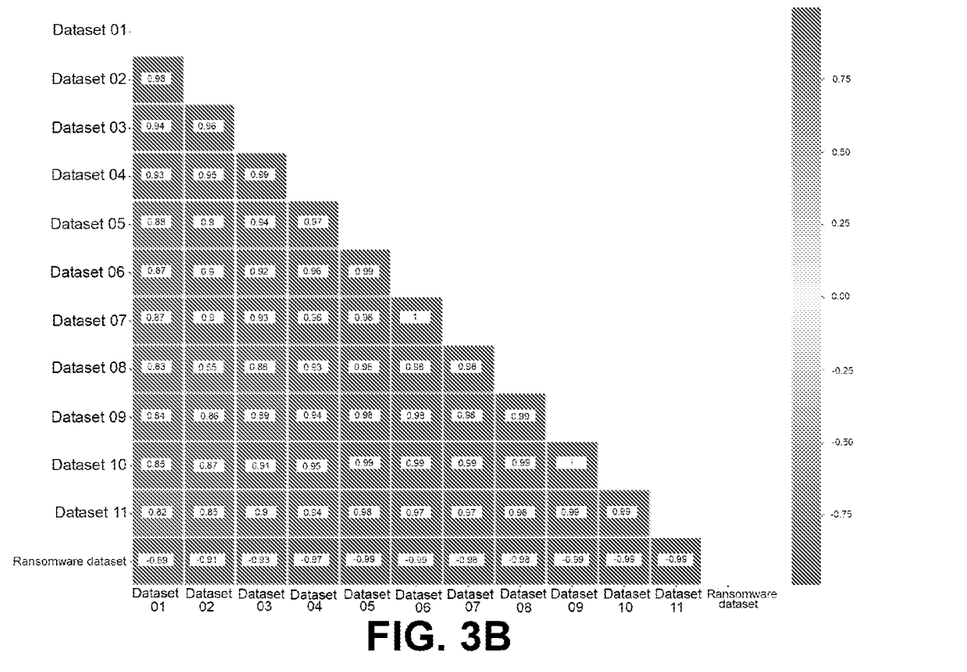
FIG. 3B illustrates another schematic diagram of an example of scoring according to some embodiments of the present disclosure.

FIGS. 3A and 3B illustrate heat map schematic diagrams of scores of datasets according to an example of the present disclosure. FIG. 3A is a heat map of the correlation coefficient of a deduplicated dataset without being attacked in an example. FIG. 3B is a heat map of the correlation coefficient of a deduplicated dataset under a simulated attack in that example. When the malware encrypts files and replaces the original files, it will turn the data into high-entropy data. Therefore, the suspicious result of the malware attack may be a reduction in the count of the statistical features of the plurality of deduplicated blocks of the file system and a change in the distribution of the statistical features of the deduplicated blocks, resulting in a drastic change in the feature values and the associated system.

Referring to FIG. 3A and FIG. 3B, the horizontal and vertical coordinates are identifiers of datasets, including identifiers of a total of 12 datasets from dataset 01 to dataset 11 and the current dataset, and the numbers shown on the quadrant squares are correlation coefficients between the corresponding one dataset and the other dataset. As can be seen in FIG. 3A, the correlation coefficient is gradually changing with time, and the relationship of datasets changes from positive to negative. The correlation coefficient varies smoothly with the changes of adjacent datasets, which indicates that the distribution of the deduplicated data blocks does not fluctuate significantly. Here, the score $T_c$ of the current dataset is:

$$T_c = \frac{(-0.75) + (-0.82) + (-0.84) + (-0.62) + (-0.1) + 0.014 + 0.47 + 0.63 + 0.8 + 0.95 + 0.93}{11} \approx 0.0685$$

Since the ransomware attack encrypts the data of the storage object and deletes the files, the change in the distribution of the deduplicated data blocks can be reflected by the correlation coefficients. In an example, a ransomware attack on this storage object is simulated by writing encrypted data, and 20% of the original files are deleted, as can be seen in FIG. 3B, the score $T_r$ for the "ransomware" dataset is:

$$T_r = \frac{(-0.89) + (-0.91) + (-0.93) + (-0.97) + (-0.99) + (-0.99) + (-0.98) + (-0.98) + (-0.99) + (-0.99) + (-0.99)}{11} \approx -0.965$$

Further, it can be seen in FIG. 3B that after the ransomware attack, the correlation coefficients of the ransomware dataset change dramatically, and from the previous positive values of correlation coefficients and corresponding scores of dataset 01 to dataset 11, the correlation coefficients and scores of the ransomware dataset suddenly change to negative values, which means that there is a great fluctuation in the distribution of the deduplicated blocks.

In some embodiments, a threshold for scores can be set (e.g., −0.85), and when a score is detected to exceed (be greater than or less than or equal to) the predetermined threshold, it can be determined that the storage system may be under malware attack.

If a possible ransomware attack is detected, the saved snapshots for the storage object can be fixed or frozen to avoid being deleted by a snapshot spin-out policy. At the same time, an administrator can also be alerted to take appropriate actions to address the issue to help quickly locate the suspicious time interval under attack. The user can combine file integrity checking methods such as file name checking, file header checking, and file content checking to improve the accuracy of detection in identifying ransomware attacks. If it is a true threat, the administrator can roll back to a previous clean snapshot to recover data. If it is a false alert, the administrator can unlock the snapshot and reset the counter.

In some examples of the present disclosure, snapshots can be generated every two hours for the storage system, and statistics and analysis for deduplicated data can be performed on the storage system every two hours. After a period of time, the storage system is attacked by malware, and the system makes statistics on and scores the data feature vectors of the deduplicated data blocks and finds the point in time under suspicious attack, for example, the first point in time. Then, a storage snapshot located closest to and earlier than that first point in time would be a good candidate snapshot for the user to check clean snapshots. The way in which the user manually checks snapshots may include detecting the integrity of files, detecting the hash values of the files, and the like, which is not limited in this embodiment.

In some embodiments, after determining that the storage object corresponding to the first time point is under attack, snapshots of the storage object before the first time point are determined to be candidate snapshots, and the candidate snapshots are locked to avoid being deleted. In some embodiments, the candidate snapshots are checked, and a snapshot that corresponds to a time point when the storage system is not under attack by malware and has the latest generation time is selected as a target snapshot. The storage system is recovered to a state corresponding to the target snapshot according to the target snapshot. In some embodiments, after a rollback to a clean target snapshot state, the user can normally access original non-encrypted data, and then the user can use antivirus software to discover and remove malware from the system.

For file systems where the original data is frequently deleted and repopulated with new data, the technical solutions of the present disclosure may not be applicable. In fact, in such file systems, ransomware programs may not be a big threat because files in the system will be quickly deleted. In addition, there may be false alerts due to random user activities. For example, if a user process is writing compressed files to the file system while another user process is deleting a large number of regular files containing deduplicated data blocks, it is difficult to distinguish this scenario from a ransomware attack.

It can be understood that in some embodiments of the present disclosure, in order to improve the accuracy of identifying malware attacks, other file integrity checking methods, such as file name checking, file magic header checking, and file content checking, may be used in combination to check the integrity of files, so as to improve the accuracy of detection in identifying ransomware attacks.

In the data detection solution provided by embodiments of the present disclosure, a deduplicated data block counter in the storage object is used to periodically collect and store the count of in-line deduplications, and based on changes in the distribution of sample data that reflect changes in entropy, unknown variants of ransomware attacks can be detected, so that detection of malware activities can be accomplished at a very low cost. This data detection solution has very little overhead compared with full file system-level file integrity scanning check. In some embodiments, deduplicated data blocks can be selected as data samples because the change in data distribution of the deduplicated data blocks can reflect the change in entropy of a given storage system. In combination with such sample data, a scoring system based on correlation coefficients is introduced to evaluate the relationship between sample datasets so as to identify suspicious malware attacks.

In the scoring system, the system will automatically perform evaluation and scoring to detect attack activities of malware within a time window. Here, the Euclidean distance between the deduplicated data block distributions reflects the difference between the sample datasets. The Pearson correlation coefficient indicates the relationship between the sample datasets. Scoring is performed between a plurality of datasets to reflect the magnitude of change in the distribution of sample data. This technical solution can detect malware attack activities, even if they are unknown new variants of malware, thus getting rid of the limitation of specifically targeting certain malware. This method supports automatic and manual initiation of detection scoring, which can be combined with other anti-ransomware technologies to protect user data. If a potential malware threat is detected, previous snapshots in the storage object will be fixed to avoid being deleted, and an alert is sent to the administrator for the administrator to confirm the threat and take appropriate actions. If a file integrity checking utility exists in the storage system, it can also be launched when a malware attack threat is detected. The administrator can also manually trigger a scoring system to check whether the current working storage object is under attack by malware.

Implementing the above embodiments of the present disclosure and combinations thereof can help to quickly locate the point in time of the effect by malware. Based on the sampling statistics of reads and writes of a plurality of deduplicated data blocks of the storage system, by executing a scoring mechanism on the counting vectors of the plurality of deduplicated data blocks, it is possible to automatically and quickly locate the time range of the effect by malware after the malware attack, thus helping, with relatively low overhead, users to quickly locate the time boundary of the malware attack for faster recovery from the malware attack.

Figure 4:
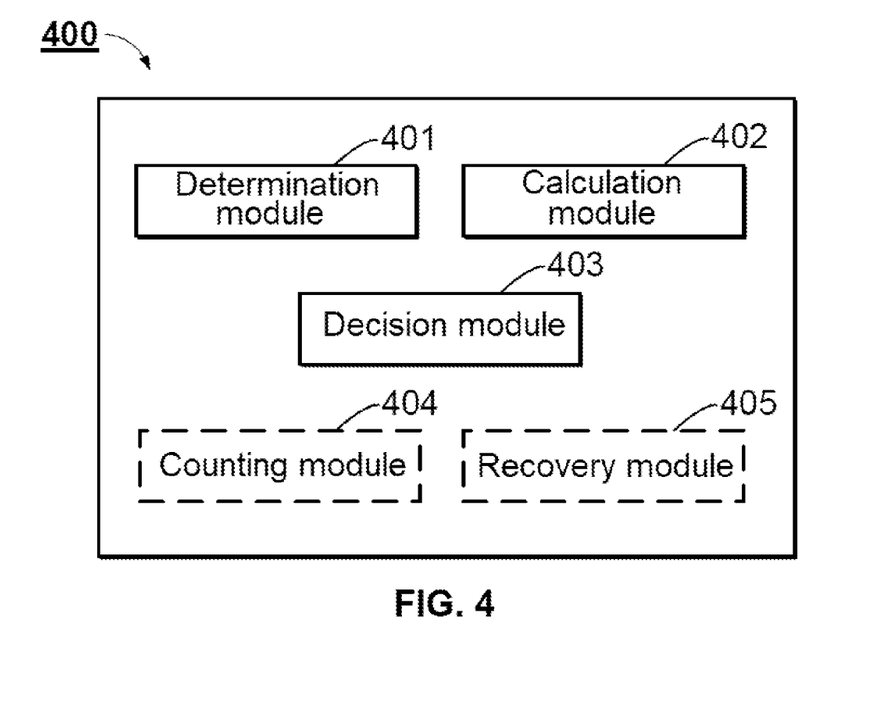
FIG. 4 illustrates a schematic diagram of functional modules of a system according to some embodiments of the present disclosure.

FIG. 4 illustrates a schematic diagram of functional modules of storage system 400 according to an embodiment of the present disclosure. In the embodiment of the present application, storage system 400 may be divided into functional modules. For example, various functions of storage system 400 may be divided into various functional modules, or two or more functions of storage system 400 may be integrated into one functional module, which is not limited in this embodiment. This storage system 400 may include determination module 401, calculation module 402, decision module 403, etc. The various functional modules may be implemented by software, hardware, or a combination of both.

Determination module 401 may be configured to determine count features respectively corresponding to a plurality of time points based on data blocks of a storage object. Calculation module 402 may be configured to calculate, for a first time point among the plurality of time points and according to the count features respectively corresponding to the plurality of time points, a plurality of corresponding correlation coefficients between a count feature for the first time point and count features for the other time points among the plurality of time points. Decision module 403 may be configured to determine, if a score determined according to the plurality of correlation coefficients is less than a predetermined threshold, that the storage object corresponding to the first time point is under attack.

In some embodiments, the data blocks are deduplicated data blocks. In some embodiments, determination module 401 may further be configured to determine statistical features of the deduplicated data blocks prior to counting the number of the deduplicated data blocks in the storage object that conform to the statistical features at the plurality of time points, wherein the statistical features of the deduplicated data blocks may be binary bytes of a predetermined length. Calculation module 402 may further be configured to be able to calculate the plurality of corresponding correlation coefficients based on distances between the count feature for the first time point and the count features for other time points among the plurality of time points. In some embodiments, the score is an average of the plurality of correlation coefficients.

Storage system 400 may further include counting module 404 configured to count the number of deduplicated data blocks in the storage object that conform to the statistical features at the plurality of time points. Counting module 404 is further configured to set to perform, at a predetermined time interval, the counting of the number of the deduplicated data blocks in the storage object that conform to the statistical features.

Storage system 400 may further include recovery module 405 configured to check candidate snapshots and select a snapshot that corresponds to a time point when the storage system is not under attack by malware and has the latest generation time as a target snapshot. The storage system is recovered to a state corresponding to the target snapshot according to the target snapshot. Recovery module 405 may further be configured to determine, after determining that the storage object corresponding to the first time point is under attack, that snapshots of the storage object prior to the first time point are candidate snapshots. The candidate snapshots are locked to avoid being deleted.

By implementing the functional modules of storage system 400 provided by this embodiment, the storage system can be protected, and the point in time when it is attacked by malware can be quickly located, which improves checking efficiency, saves checking costs, and helps users to quickly recover stored data.

It can be understood that the specific implementation of the various functions included in the foregoing various modules may be implemented with reference to the descriptions in the foregoing other embodiments. The modules and/or units may be implemented in part or in whole as hardware modules, software modules, firmware modules, or any combination thereof. In particular, the procedure, method, or process described in some embodiments may be implemented by hardware in a storage system or a host corresponding to the storage system or another computing device independent of the storage system.

Figure 5:
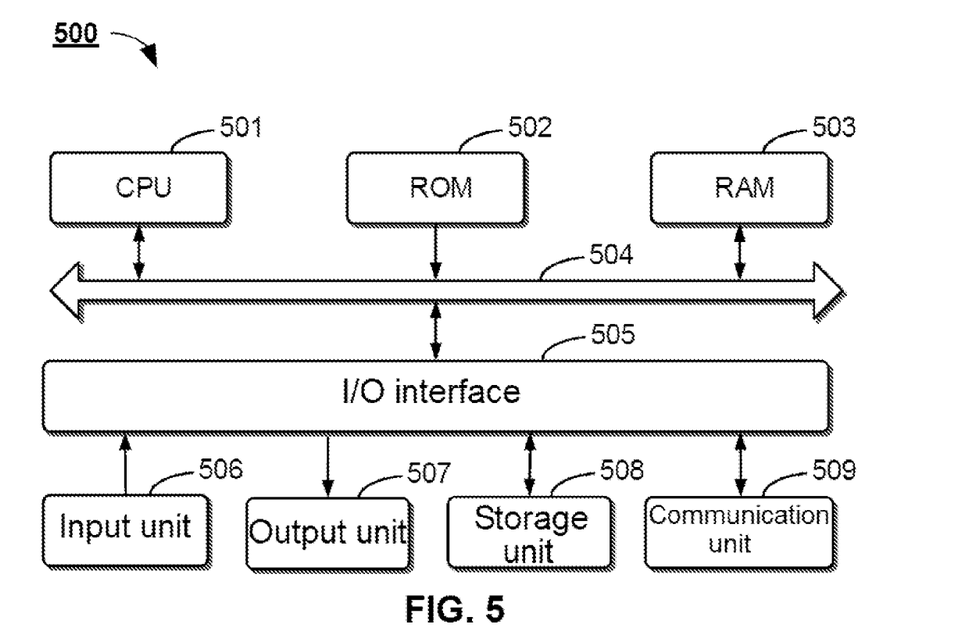
FIG. 5 illustrates a schematic structural diagram of a device that can be configured to implement embodiments of the present disclosure.

FIG. 5 illustrates a schematic structural diagram of example device 500 that can be configured to implement some embodiments of the present disclosure. Device 500 may be configured to implement the above edge node or repository server. As shown in FIG. 5, device 500 includes central processing unit (CPU) 501 which may perform various appropriate actions and processing according to computer program instructions stored in read-only memory (ROM) 502 or computer program instructions loaded from storage unit 508 to random access memory (RAM) 503. Various programs and data required for operations of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

Processing unit 501 may execute the various methods and/or processing described above, such as method 100, system 400, etc. For example, in some embodiments, system 400 may be implemented as a computer software program that is tangibly included in a machine-readable medium such as storage unit 508. In some embodiments, part of or all the computer program may be loaded and/or installed to device 500 via ROM 502 and/or communication unit 509. When the computer program is loaded onto RAM 503 and executed by CPU 501, one or more steps of method 100 described above may be performed. Alternatively, in other embodiments, CPU 501 may be configured to perform method 100 in any other suitable manners (e.g., by means of firmware).

The functions described herein above may be performed, at least in part, by one or a plurality of hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Load Programmable Logic Device (CPLD), and the like.

In some embodiments, the methods and processes described above may be implemented as a computer program product. The computer program product may include a computer-readable storage medium on which computer-readable program instructions for performing various aspects of the present disclosure are loaded.

Program code for implementing the method of the present disclosure may be written by using one programming language or any combination of a plurality of programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code can be completely executed on a machine, partially executed on a machine, partially executed on a machine as an independent software package and partially executed on a remote machine, or completely executed on a remote machine or a server.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, other programmable data processing apparatuses, or other devices, so that a series of operating steps may be executed on the computer, the other programmable data processing apparatuses, or the other devices to produce a computer-implemented process, such that the instructions executed on the computer, the other programmable data processing apparatuses, or the other devices may implement the functions/actions specified in one or more blocks in the flow charts and/or block diagrams.

In the context of the present disclosure, a machine-readable medium may be a tangible medium that may include or store a program for use by an instruction execution system, apparatus, or device or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combinations thereof.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, and the module, program segment, or part of an instruction includes one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Additionally, although operations are depicted in a particular order, this should be understood that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

Various embodiments of the present disclosure have been described above. The foregoing description is illustrative rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or the technical improvements to technologies on the market, or to enable other people of ordinary skill in the art to understand the various embodiments disclosed herein.

The invention claimed is:

1. A data detection method, the method comprising:
   determining count features respectively corresponding to a plurality of time points based on data blocks of a storage object, wherein the count features comprise a plurality of count values for the data blocks, and wherein the data blocks are deduplicated data blocks;
   determining, for a first time point among the plurality of time points and according to the count features respectively corresponding to the plurality of time points, a plurality of corresponding correlation coefficients between a count feature for the first time point and count features for the other time points among the plurality of time points, wherein determining the count features respectively corresponding to the plurality of time points based on the data blocks of the storage object comprises:
      counting the number of the deduplicated data blocks in the storage object that conform to statistical features determined for the deduplicated data blocks at the plurality of time points, wherein the statistical features comprise numbers of reads and writes performed of the deduplicated data blocks, and
      generating the count features respectively corresponding to the plurality of time points according to the number counted; and
   determining, if a score determined according to the plurality of correlation coefficients is less than a predetermined threshold, that the storage object corresponding to the first time point is under attack, wherein the score comprises an average of the plurality of correlation coefficients.

2. The method according to claim 1, further comprising: determining the plurality of corresponding correlation coefficients based on distances between the count feature for the first time point and the count features for the other time points among the plurality of time points.

3. The method according to claim 1, further comprising: determining the statistical features of the data blocks prior to counting the number of the deduplicated data blocks in the storage object that conform to the statistical features at the plurality of time points, wherein the statistical features are binary bytes of a predetermined length.

4. The method according to claim 1, further comprising: determining, after determining that the storage object corresponding to the first time point is under attack, that snapshots of the storage object prior to the first time point are candidate snapshots; and
locking the candidate snapshots to avoid being deleted.

5. The method according to claim 4, further comprising: checking the candidate snapshots and selecting a snapshot that corresponds to a time point when the storage system is not under attack by malware and has the latest generation time as a target snapshot; and
recovering, according to the target snapshot, the storage system to a state corresponding to the target snapshot.

6. The method according to claim 1, further comprising: setting to preform, at a predetermined time interval, the counting of the number of the deduplicated data blocks in the storage object that conform to the statistical features.

7. An electronic device for snapshot classification, comprising:
a processor; and
a memory coupled to the processor and having instructions stored therein, wherein the instructions, when executed by the processor, cause the electronic device to perform operations comprising:
determining count features respectively corresponding to a plurality of time points based on data blocks of a storage object, wherein the count features comprise a plurality of count values for the data blocks, and wherein the data blocks are deduplicated data blocks;
determining, for a first time point among the plurality of time points and according to the count features respectively corresponding to the plurality of time points, a plurality of corresponding correlation coefficients between a count feature for the first time point and count features for the other time points among the plurality of time points, wherein determining the count features respectively corresponding to the plurality of time points based on the data blocks of the storage object comprises:
counting the number of the deduplicated data blocks in the storage object that conform to statistical features determined for the deduplicated data blocks at the plurality of time points, wherein the statistical features comprise numbers of reads and writes performed of the deduplicated data blocks, and
generating the count features respectively corresponding to the plurality of time points according to the number counted; and
determining, if a score determined according to the plurality of correlation coefficients is less than a predetermined threshold, that the storage object corresponding to the first time point is under attack, wherein the score comprises an average of the plurality of correlation coefficients.

8. The electronic device according to claim 7, wherein the operations further comprise:
determining the plurality of corresponding correlation coefficients based on distances between the count feature for the first time point and the count features for the other time points among the plurality of time points.

9. The electronic device according to claim 7, wherein the operations further comprise:
determining the statistical features of the data blocks prior to counting the number of the deduplicated data blocks in the storage object that conform to the statistical features at the plurality of time points, wherein the statistical features are binary bytes of a predetermined length.

10. The electronic device according to claim 7, wherein the operations further comprise: determining, after determining that the storage object corresponding to the first time point is under attack, that snapshots of the storage object prior to the first time point are candidate snapshots; and locking the candidate snapshots to avoid being deleted.

11. The electronic device according to claim 10, wherein the operations further comprise:
checking the candidate snapshots and selecting a snapshot that corresponds to a time point when the storage system is not under attack by malware and has the latest generation time as a target snapshot; and
recovering, according to the target snapshot, the storage system to a state corresponding to the target snapshot.

12. The electronic device according to claim 7, the actions further comprising:
setting to preform, at a predetermined time interval, the counting of the number of the deduplicated data blocks in the storage object that conform to the statistical features.

13. A computer program product having a non-transitory computer readable medium which stores a set of instructions for data detection; the set of instructions, when carried out by computerized circuitry, causing the computerized circuitry to perform a method of:
determining count features respectively corresponding to a plurality of time points based on data blocks of a storage object, wherein the count features comprise a plurality of count values for the data blocks, and wherein the data blocks are deduplicated data blocks;
determining, for a first time point among the plurality of time points and according to the count features respectively corresponding to the plurality of time points, a plurality of corresponding correlation coefficients between a count feature for the first time point and count features for the other time points among the plurality of time points, wherein determining the count features respectively corresponding to the plurality of time points based on the data blocks of the storage object comprises:
counting the number of the deduplicated data blocks in the storage object that conform to statistical features determined for the deduplicated data blocks at the plurality of time points, wherein the statistical features comprise numbers of reads and writes performed of the deduplicated data blocks, and
generating the count features respectively corresponding to the plurality of time points according to the number counted; and determining, if a score determined according to the plurality of correlation coefficients is less than a predetermined threshold, that the storage object corresponding to the first time point is under attack, wherein the score comprises an average of the plurality of correlation coefficients.

14. The computer program product according to claim 13, wherein the machine-executable instructions, when executed, further cause the machine to perform the following:

determining, after determining that the storage object corresponding to the first time point is under attack, that snapshots of the storage object prior to the first time point are candidate snapshots; and locking the candidate snapshots to avoid being deleted.

* * * * *